(12) United States Patent
Allen et al.

(10) Patent No.: US 8,135,924 B2
(45) Date of Patent: Mar. 13, 2012

(54) DATA STORAGE DEVICE DRIVER

(75) Inventors: James P Allen, Austin, TX (US); Gary Steven Domrow, Austin, TX (US); John Leslie Neemidge, Round Rock, TX (US); Stephen M Tee, Marble Falls, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/353,492

(22) Filed: Jan. 14, 2009

(65) Prior Publication Data

US 2010/0180086 A1 Jul. 15, 2010

(51) Int. Cl.
G06F 13/00 (2006.01)
G06F 13/28 (2006.01)
G06F 3/00 (2006.01)
G06F 5/00 (2006.01)

(52) U.S. Cl. ........... 711/154; 711/112; 711/E12.002; 710/6; 710/52

(58) Field of Classification Search ........... 711/154, 711/112, E12.002; 710/6, 52
See application file for complete search history.

(56) References Cited

U.S. PATENT DOCUMENTS

| 6,615,215 B1 | 9/2003 | Petty |
| 7,363,399 B2 | 4/2008 | Shum et al. |
| 7,895,273 B1 * | 2/2011 | Haldar .................. 709/206 |
| 2004/0194095 A1 | 9/2004 | Lumb et al. |
| 2005/0195740 A1 | 9/2005 | Kwon |
| 2005/0229182 A1 | 10/2005 | Grover et al. |
| 2007/0156955 A1 | 7/2007 | Royer, Jr. et al. |
| 2008/0046609 A1 | 2/2008 | Shum et al. |
| 2008/0147879 A1 | 6/2008 | Buriano et al. |
| 2008/0163249 A1 | 7/2008 | Garza et al. |
| 2008/0172389 A1 | 7/2008 | Cho |
| 2008/0172526 A1 | 7/2008 | Verma et al. |

OTHER PUBLICATIONS

Jianyong Zhang, Self-Tuning Storage Systems for Performance Virtualization, May 2006, 1-150, The Pennsylvania State University, The Graduate School, Department of Computer Science and Engineering, Pennsylvania, US.

* cited by examiner

*Primary Examiner* — Edward Dudek, Jr.
(74) *Attorney, Agent, or Firm* — Garg Law Firm, PLLC; Rakesh Garg; Libby Z. Toub

(57) ABSTRACT

A method, system, and computer usable program product for an improved data storage device driver are provided in the illustrative embodiments. For managing an elevator queue, several requests are stored in the elevator queue. A determination is made whether the elevator queue is sorted. A number of requests in the elevator queue is determined if the elevator queue is unsorted. The unsorted elevator queue is monitored. Reaching a threshold condition in the unsorted elevator queue is detected. Sorting of the unsorted elevator queue is initiated. The requests may be I/O requests for a data storage device. The elevator queue may be sorted according to an ascending or descending order of data block addresses in the requests. The monitoring may monitor a remaining number of unsorted requests in the elevator queue as requests are removed from the elevator queue. The threshold condition may be associated with a threshold value.

20 Claims, 5 Drawing Sheets

DATA STORAGE DEVICE DRIVER

BACKGROUND OF THE INVENTION

1. Field of the Invention

The present invention relates generally to an improved data processing system, and in particular, to a computer implemented method for operating data storage devices. Still more particularly, the present invention relates to a computer implemented method, system, and computer usable program code for an improved data storage device driver.

2. Description of the Related Art

Data storage devices are devices used for storing data in a data processing system. Some examples of data storage devices are magnetic hard disks, flash memory devices, optical drives, solid state mass storage devices that may substitute magnetic hard disks, and tape drives.

An application executing on a data processing system may send data input/output (I/O) request to a data storage device. The application, generally through an operating system, utilizes a device driver associated with the data storage device for sending the I/O requests, and receiving any corresponding responses. A device driver is a software or firmware that contains the information necessary for communicating with a specific hardware device. Generally, a device driver is specific to a particular operating system. In commonly used data processing systems, the application sends a request to the operating system, the operating system sends a corresponding request to the device driver, and the device driver sends a corresponding request to the device. Any response from the device to the application may traverse the same path in reverse order.

Device drivers for data storage devices employ certain techniques for obtaining efficiency in processing the I/O requests. For example, a data storage device driver may use a queue data structure to sequence the I/O requests received from various applications. Such a queue is known as an elevator queue, and an algorithm for populating the elevator queue is called an elevator algorithm.

An elevator algorithm sorts the I/O requests by block addresses on the data storage device, such as from the lowest address requested to the highest address requested. The elevator algorithm sorts the I/O requests in block address order so that the consequent I/O requests issued to the data storage device request data from adjacent or nearby blocks.

A block address is an address in a data structure implemented on the data storage device. The block address corresponds to a location in the data storage device where a block of data may be read or written. A block of data is predefined size of data in number of bits or bytes. For example, a block of data may be 512 bytes of data that begins at the specified block address.

The elevator queue in a data storage device driver is of a size proportional to an I/O queue size associated with the data storage device. An I/O queue is a queue associated with a data storage device where the data storage device receives I/O requests. For example, if the I/O queue associated with a particular data storage device is capable of storing ten I/O requests, a data storage device driver might implement an elevator queue to sort and store fifty I/O requests.

SUMMARY OF THE INVENTION

The illustrative embodiments provide a method, system, and computer usable program product for an improved data storage device driver. For managing an elevator queue, several requests are stored in the elevator queue. A determination is made whether the elevator queue is sorted. A number of requests in the elevator queue is determined if the elevator queue is unsorted. The unsorted elevator queue is monitored. Reaching a threshold condition in the unsorted elevator queue is detected. Sorting of the unsorted elevator queue is initiated.

In one embodiment, the requests may be I/O requests for a data storage device. In another embodiment, the elevator queue may be sorted according to an ascending order of data block addresses in the requests. In another embodiment, the monitoring may monitor a remaining number of unsorted requests in the elevator queue as requests are removed from the elevator queue.

In an embodiment, the threshold condition may be associated with a threshold value. Reaching the threshold condition may be reaching a value equal to or less than the threshold value. In another embodiment, reaching the threshold value may be reaching at the threshold value, within a tolerance value from the threshold value, or a combination thereof.

In an embodiment, a detection may be made of reaching a second threshold condition in the elevator queue. Coalescing the requests in the elevator queue may be initialized. In another embodiment, the second threshold condition may be the same as the threshold condition.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
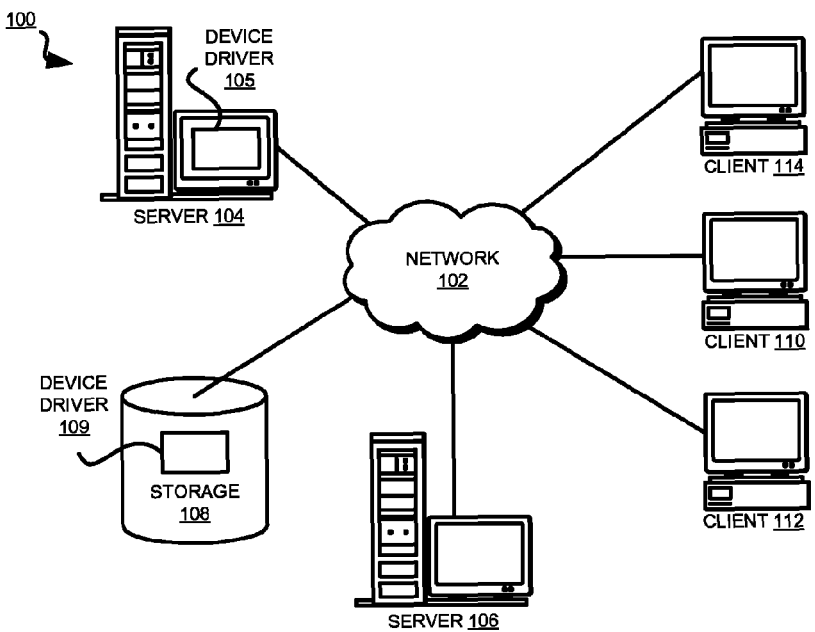
FIG. 1 depicts a pictorial representation of a network of data processing systems in which illustrative embodiments may be implemented.

The illustrative embodiments recognize that accessing adjacent or nearby data blocks on a data storage device is a more efficient way of accessing data than accessing randomly ordered data blocks. The present device drivers for data storage devices sort the elevator queue for achieving this efficiency. However, the illustrative embodiments recognize that the present device drivers do not perform the sorting of the elevator queue and give up sorting under certain conditions.

The illustrative embodiments recognize that leaving the elevator queue unsorted when those certain conditions arise, and when those conditions have subsided is undesirable. For example, by leaving the elevator queue unsorted, the data storage device may receive I/O requests that concern data blocks that may be widely dispersed across the data storage device media. For the reader heads, physically reaching the widely dispersed data blocks is a time consuming process. Furthermore, accessing widely dispersed data blocks increases the wear and tear on the data storage device.

The illustrative embodiments recognize that by leaving the elevator queue unsorted certain other advantages of the elevator queue are also lost. For example, in a sorted elevator queue, adjacent I/O requests request adjacent or nearby data blocks from the data storage device. The illustrative embodiments recognize that in a sorted elevator queue, certain adjacent I/O requests may be combined, or coalesced, into one I/O request. For example, when two I/O requests request adjacent data blocks, the two I/O requests may be coalesced into one I/O request that requests a larger amount of data beginning at the lower of the two data block addresses.

The illustrative embodiments recognize that if the elevator queue is left unsorted, I/O requests queued in the elevator queue cannot be combined. Thus, even if I/O requests requesting adjacent data blocks are pending, they cannot be combined to reduce to overall number of I/O requests that the data storage device has to process. The inability to coalesce I/O requests reduces the efficiency of the data storage device, as the data storage device has to process a larger number of un-coalesced I/O requests to deliver the same amount of data as may be requested in one coalesced I/O request.

As one reason, the illustrative embodiments further recognize that present data storage device drivers leave the elevator queue unsorted because sorting uses computing resources, such as processor time and memory.

Presently, a data storage device driver leaves the elevator queue unsorted when the device driver receives, or has pending, a number of I/O requests that exceeds or overwhelms the elevator queue size. For example, a present data storage device driver may decide not to sort the elevator queue if the elevator queue can hold fifty I/O requests, and the device driver receives a burst of hundred I/O requests. Under this type of example circumstance, the data storage device driver abandons sorting all the pending I/O requests, and processes the I/O requests on a first in first out (FIFO) basis.

Furthermore, presently, the data storage device drivers employ two strategies for dealing with the volume of I/O requests that overwhelm the elevator queue. One strategy is to refuse all I/O requests beyond the elevator queue capacity. The illustrative embodiments recognize that this strategy may leave certain applications starved for data, sometimes for an indefinite time. The illustrative embodiments recognize that applications that cannot access data on a data storage device may, for example, degrade the overall system performance, degrade the user experience, fail to meet business critical goals, or fail to achieve service level agreement metrics.

The second strategy in the present data storage device drivers is to accept all the I/O requests, but abandon sorting the elevator queue once the number of pending I/O requests exceeds the elevator queue capacity. The illustrative embodiments recognize that in either of these strategies, the data storage device drivers do not resume sorting even when the number of pending I/O requests abates to a number that can be accommodated in the elevator queue. In other words, under either of the present strategies, once the data storage device driver abandons the sorting, the device driver does not resume sorting until the device driver is reinitialized.

The illustrative embodiments further recognize that requiring re-initialization of a device driver to resume sorting and regain data access performance is undesirable. Restarting or reinitializing a device driver can cause service disruption, delays, and degraded system performance. These disruptions, delays, and degradations can cause applications to fail or cause an error.

To address these and other related problems in present data storage device drivers, the illustrative embodiments provide a method, computer usable program product, and data processing system for an improved data storage device driver. Using the illustrative embodiments, a device driver can continue sorting the pending I/O requests while the pending number of I/O requests exceeds the elevator queue size. Using the illustrative embodiments, a device driver can resume sorting the pending I/O requests after the sorting has been abandoned, without requiring a re-initialization of to the device driver.

The illustrative embodiments are described as improving a data storage device driver only as an example. Device driver based implementation is not intended to be a limitation on the illustrative embodiments. Within the scope of the illustrative embodiments, an implementation may implement the illustrative embodiments in another software application that may execute on a data processing system. Another implementation may employ the illustrative embodiments in a firmware separate from the device driver within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures.

Figure 2:
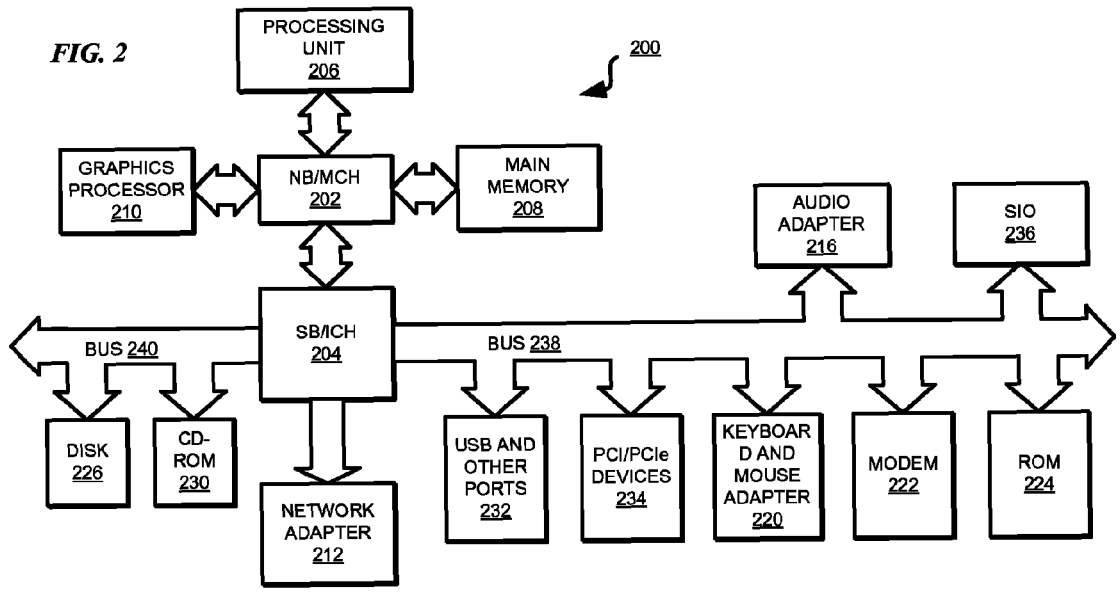
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. Server 104 may have device driver 105, executing thereon. Device driver 105 may be a device driver for a data storage device associated with server 104. Device driver 109 may similarly execute in association with storage 108. For example, storage 108 may itself be a data processing system and device driver 109 may execute thereon. As another example, storage 108 may be accessible from a data processing system and device driver 109 may execute on storage 108, the data processing system, or a combination thereof.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
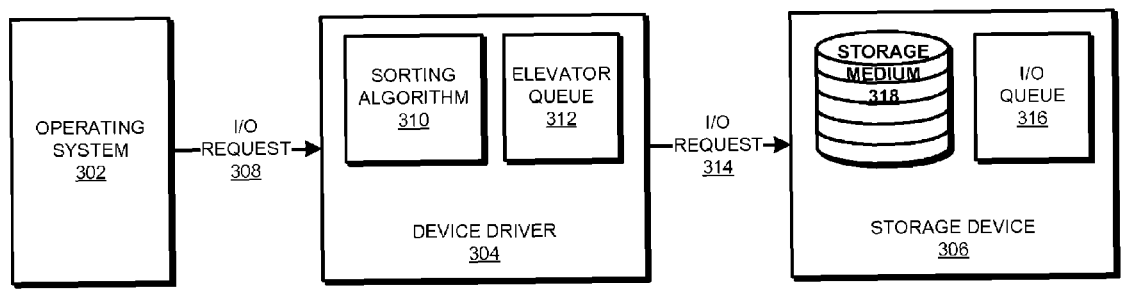
FIG. 3 depicts a block diagram of device driver configuration in which an illustrative embodiment may be implemented.

With reference to FIG. 3, this figure depicts a block diagram of device driver configuration in which an illustrative embodiment may be implemented. Operating system 302 may be the operating system of a data processing system, such as server 104, under which an application may execute. Device driver 304 may be a data storage device driver that operating system 302 may call for data I/O from a data storage device. Device driver 304 may be implemented using device driver 105 in FIG. 1.

Device driver 304 may access storage device 306 for performing data I/O. Storage device 306 may be implemented using a data storage device in server 104, or storage 108 in FIG. 1.

Operating system 302 may have an application executing thereon. Operating system 302 sends I/O request 308 to device driver 304. I/O request 308 may be the I/O request sent by the application or an I/O request generated by operating system 302 corresponding to the application's activities.

Sorting algorithm 310 sorts the incoming I/O requests, including I/O request 308, into elevator queue 312. Device driver 304 maintains a pointer into elevator queue 312 and sends the I/O request at the pointer location, I/O request 314, to storage device 306. I/O request 314 may be the same as I/O request 308, previously received one or more I/O requests, or a combination thereof.

Storage device 306 stores I/O request 314 in I/O queue 316. Storage device 306 processes I/O requests from I/O queue 316 for reading and writing data to storage medium 318.

Figure 4:
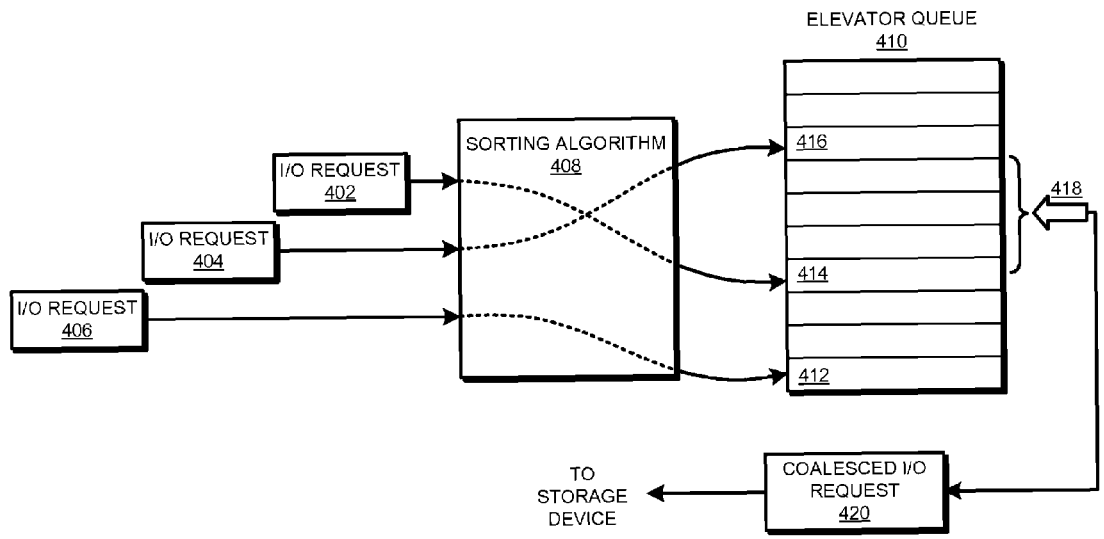
FIG. 4 depicts a block diagram of an operation of a data storage device driver that can be improved using an illustrative embodiment.

With reference to FIG. 4, this figure depicts a block diagram of an operation of a data storage device driver that can be improved using an illustrative embodiment. Each of I/O requests 402, 404, and 406 may be implemented similar to I/O request 308 in FIG. 3. Sorting algorithm 408 may be implemented using sorting algorithm 310 in FIG. 3. Elevator queue 410 may be implemented using elevator queue 312 in FIG. 3.

Sorting algorithm 408 in a device driver may receive I/O requests 402, 404, and 406 in some temporal order. As an example, sorting algorithm 408 may receive I/O request 404 after I/O request 402; and I/O request 406 after I/O request 404. Sorting algorithm 408 may order I/O requests 402, 404, and 406 by the address of data blocks they each seek to manipulate. Using this example, sorting algorithm 408 may sort I/O request 406 in position 412, I/O request 402 in position 414, and I/O request 404 in position 416 in elevator queue 410.

In one embodiment, positions 412, 414, and 416 may be in ascending order of the addresses of the data blocks sought to be manipulated by I/O requests in those positions. In another embodiment, positions 412, 414, and 416 may be in descending order of the addresses of the data blocks sought to be manipulated by I/O requests in those positions.

Pointer 418 may be a pointer in elevator queue 410. Pointer 418 may point to a set of I/O requests in elevator queue 410. A set of I/O requests is one or more I/O requests. The set of I/O requests identified by pointer 418 may be coalesced together as described above. For example, pointer 418 may point to location 414 and the I/O request at location 414 the I/O requests in three subsequent positions may be coalesced together because they seek to manipulate adjacent or nearby data blocks on a data storage device.

In the depicted example, coalesced I/O request 420 may be formed using I/O requests at position 414 and some other consecutive positions in elevator queue 410. Coalesced I/O request 420 is then directed to a data storage device.

The sorting and coalescing operation described with respect to FIG. 4 presently works so long as a device driver is not overwhelmed by I/O requests and the number of I/O request does not exceed the size of the elevator queue. Once the sorting and coalescing operations are abandoned in present device drivers, these operations do not resume unless the device driver is reinitialized.

Figure 5:
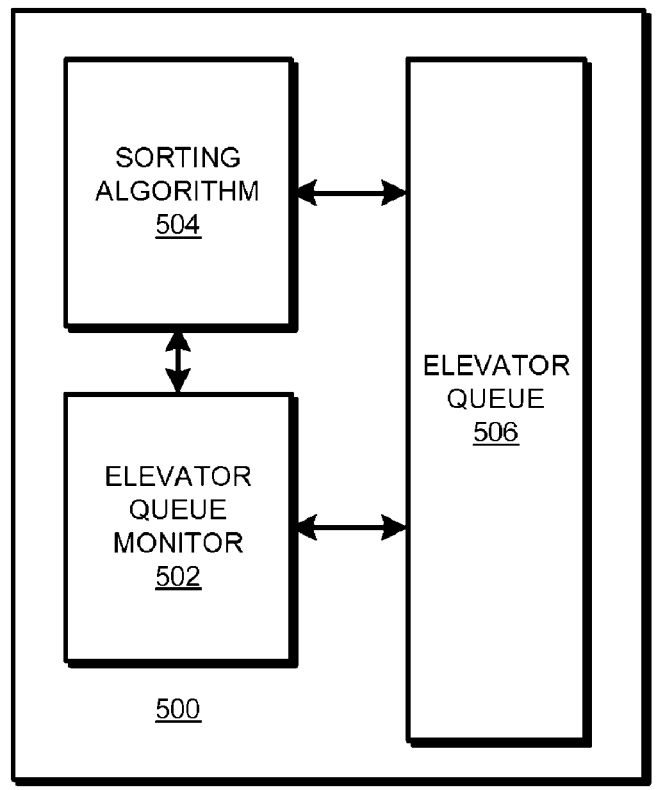
FIG. 5 depicts a block diagram of a configuration of an improved data storage device driver in accordance with an illustrative embodiment.

With reference to FIG. 5, this figure depicts a block diagram of a configuration of an improved data storage device driver in accordance with an illustrative embodiment. Device driver 500 may be implemented using device driver 304 in FIG. 3, and modified according to the illustrative embodiments.

In accordance with an illustrative embodiment, device driver 500 includes elevator queue monitor component 502. Sorting algorithm 504 communicates with elevator queue monitor component 502. Elevator queue monitor component 502 monitors the state of elevator queue 506. Elevator queue monitor component 502 may be implemented in hardware, software, or firmware in specific implementations.

In operation, elevator queue monitor component 502 monitors elevator queue 506 for the sorted or unsorted state of elevator queue 506. In one embodiment, elevator queue monitor component 502 may also monitor whether or not the I/O requests from the elevator queue are being coalesced. Furthermore, elevator queue monitor component 502 may monitor elevator queue 506 from time to time, at set periods, or based on triggering or presence of certain events in the data processing system where device driver 500 in implemented.

Elevator queue monitor component 502 may detect that elevator queue 506 has become unsorted, the I/O requests from elevator queue 506 are not being coalesced, or a combination thereof. Elevator queue monitor component 502 may continue monitoring elevator queue 506 for a threshold condition to be reached in elevator queue 506. In one embodiment, the threshold condition may be a total number of I/O requests pending in unsorted elevator queue 506.

Upon detecting the threshold condition in elevator queue 506, elevator queue monitor component 502 may trigger, initiate, send, or otherwise communicate with a component of device driver 500 that implements sorting algorithm 504. Such communication from elevator queue monitor component 502 to sorting algorithm 504 may reinitiate sorting, coalescing, or a combination thereof of the I/O requests pending in unsorted order in elevator queue 506.

Figure 6:
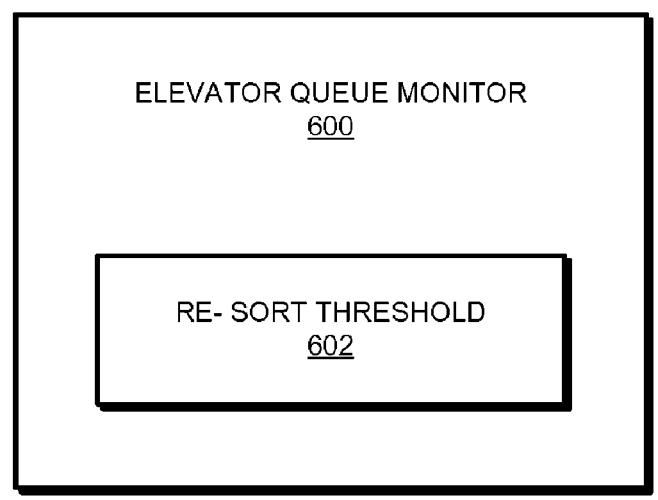
FIG. 6 depicts a block diagram of a configuration of an elevator queue monitor in accordance with an illustrative embodiment.

With reference to FIG. 6, this figure depicts a block diagram of a configuration of an elevator queue monitor in accordance with an illustrative embodiment. Elevator queue monitor component 600 may be analogous to elevator queue monitor component 502 in FIG. 5.

Elevator queue monitor component 600 includes, inter alia, re-sort threshold 602. Re-sort threshold 602 may be software code, or data in memory. The software code or the memory may reside in the device driver where elevator queue monitor component 600 is implemented, or elsewhere in the data processing system where the device driver with elevator queue monitor component 600 is implemented.

As described with respect to FIG. 5, elevator queue monitor component 600 monitors an elevator queue for detecting a threshold condition. In one embodiment, as depicted in FIG. 6, the threshold condition may be a number of pending I/O requests in the unsorted elevator queue. Then that number is equal to or less than a number stored in re-sort threshold 602, elevator queue monitor component 600 may communicate with the sorting algorithm.

For example, in one implementation, the elevator queue may be designed to hold fifty sorted I/O requests. During operation, the device driver may receive one hundred I/O requests and may abandon sorting the elevator queue. The device driver may place the one hundred I/O requests in the elevator queue on a first come first served bases. The device driver may then begin to send I/O requests from the elevator queue to an associated data storage device in a first in first out manner. Elevator queue monitor component 600 may monitor the elevator queue as the elevator queue is depleted.

As an example, extending the above example to demonstrate the operation of elevator queue monitor component 600, re-sort threshold 602 may be set at twenty five. During the monitoring of the elevator queue, elevator queue monitor component 600 may detect that the number of pending I/O requests in the unsorted elevator queue has reached at or below twenty five—the value of re-sort threshold 602. This detection is the detection of reaching the threshold condition in the elevator queue.

Upon this detection of reaching the threshold condition, in one embodiment, elevator queue monitor component 600 may issue a command to another component of the device driver that implements the sorting algorithm. In another embodiment, elevator queue monitor component 600 may raise an event that may be detected by the sorting algorithm component. Other embodiments may enable communication of the threshold condition detection between elevator queue monitor component 600 and other components of the device driver in any manner suitable for a particular implementation.

Sorting algorithm or a component implementing the sorting algorithm receives the communication from elevator queue monitor component 600 that the re-sort threshold condition has been reached in the elevator queue. The sorting algorithm code is re-executed in the device driver based on this communication.

Using the illustrative embodiments in this example manner, sorting of the elevator queue can be resumed at or near a threshold condition without having to re-initialize the device driver. In other embodiments, re-sort threshold 602 or a second threshold may be used to re-initiate the coalescing of the sorted I/O requests.

In another embodiment, one or more tolerance values may be used in conjunction with one or more threshold values. This configuration may be useful for early or late triggering of the re-sorting or re-coalescing. For example, the sorting or coalescing can be re-initiated when the condition of the elevator queue is within the tolerance value of the threshold value.

Figure 7:
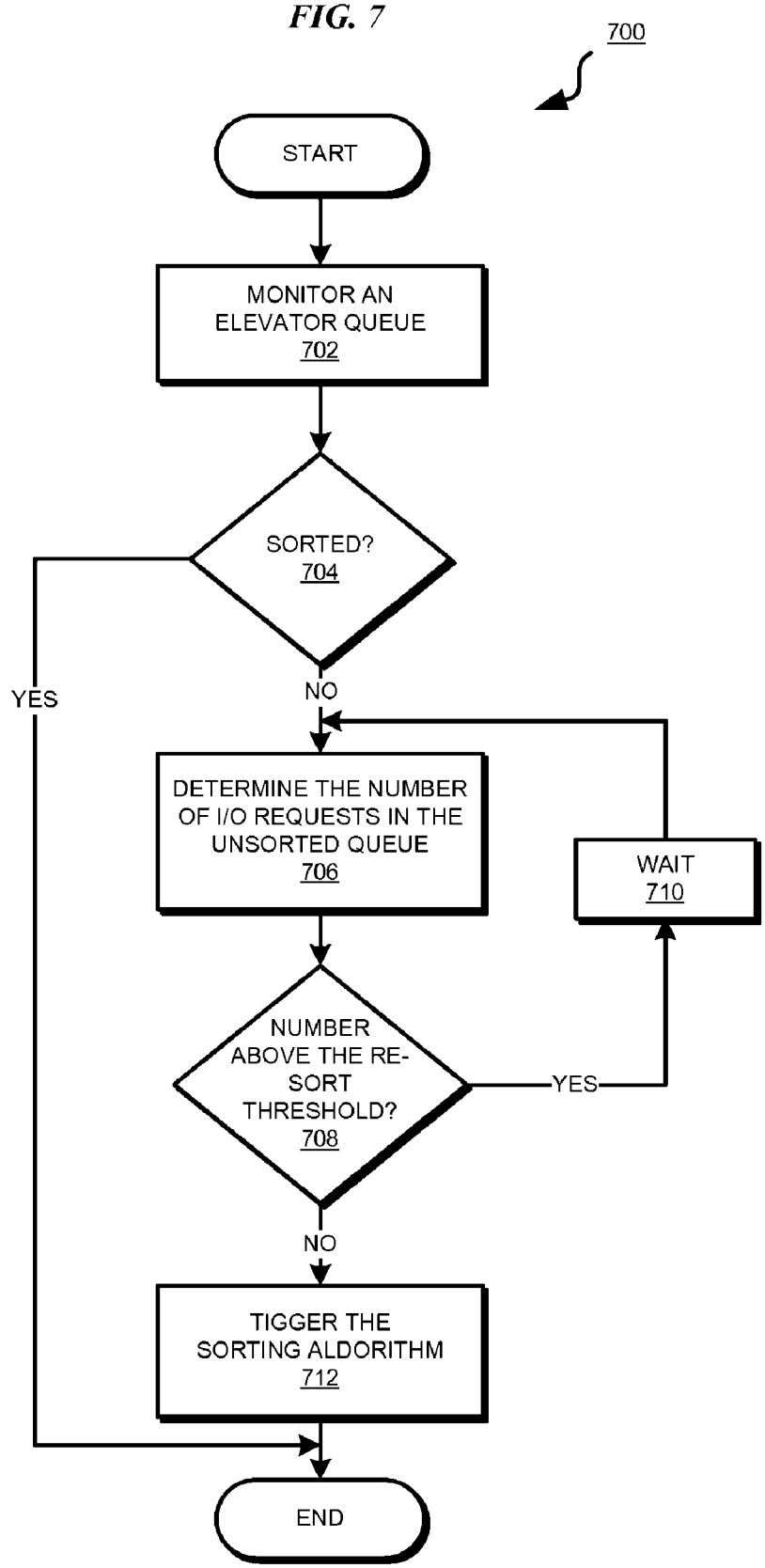
FIG. 7 depicts a flowchart of a process of detecting a threshold condition and re-sorting the elevator queue in accordance with an illustrative embodiment.

With reference to FIG. 7, this figure depicts a flowchart of a process of detecting a threshold condition and re-sorting the elevator queue in accordance with an illustrative embodiment. Process 700 may be implemented in elevator queue monitor component 600 in FIG. 6.

Process 700 begins by monitoring an elevator queue, such as elevator queue 410 in FIG. 4 (step 702). Process 700 determines if the elevator queue is in a sorted state or condition (step 704). If process 700 determines that the elevator queue is sorted ("Yes" path of step 704), process 700 ends. In one embodiment, process 700 may return to step 702 instead of ending at this determination.

If process 700 determines that the elevator queue is not sorted ("No" path of step 704), process 700 determines a number of I/O requests that are pending in the unsorted elevator queue (step 706). Process 700 determines whether the number of I/O requests determined in step 706 is above a re-sort threshold (step 708). If the number is above the re-sort threshold ("Yes" path of step 708), process 700 may wait (step 710). In one embodiment, process 700 may not wait in step 710 but monitor for an even when the number of I/O requests falls to or below the re-sort threshold.

If process 700 determines that the number of I/O requests determined in step 706 is not above the re-sort threshold ("No" path of step 708), process 700 triggers the sorting algorithm (step 712). Process 700 ends thereafter. In one embodiment, process 700 may raise an event, send a message, execute a command, or store some data in memory in step 712 to communicate with the sorting algorithm.

Figure 8:
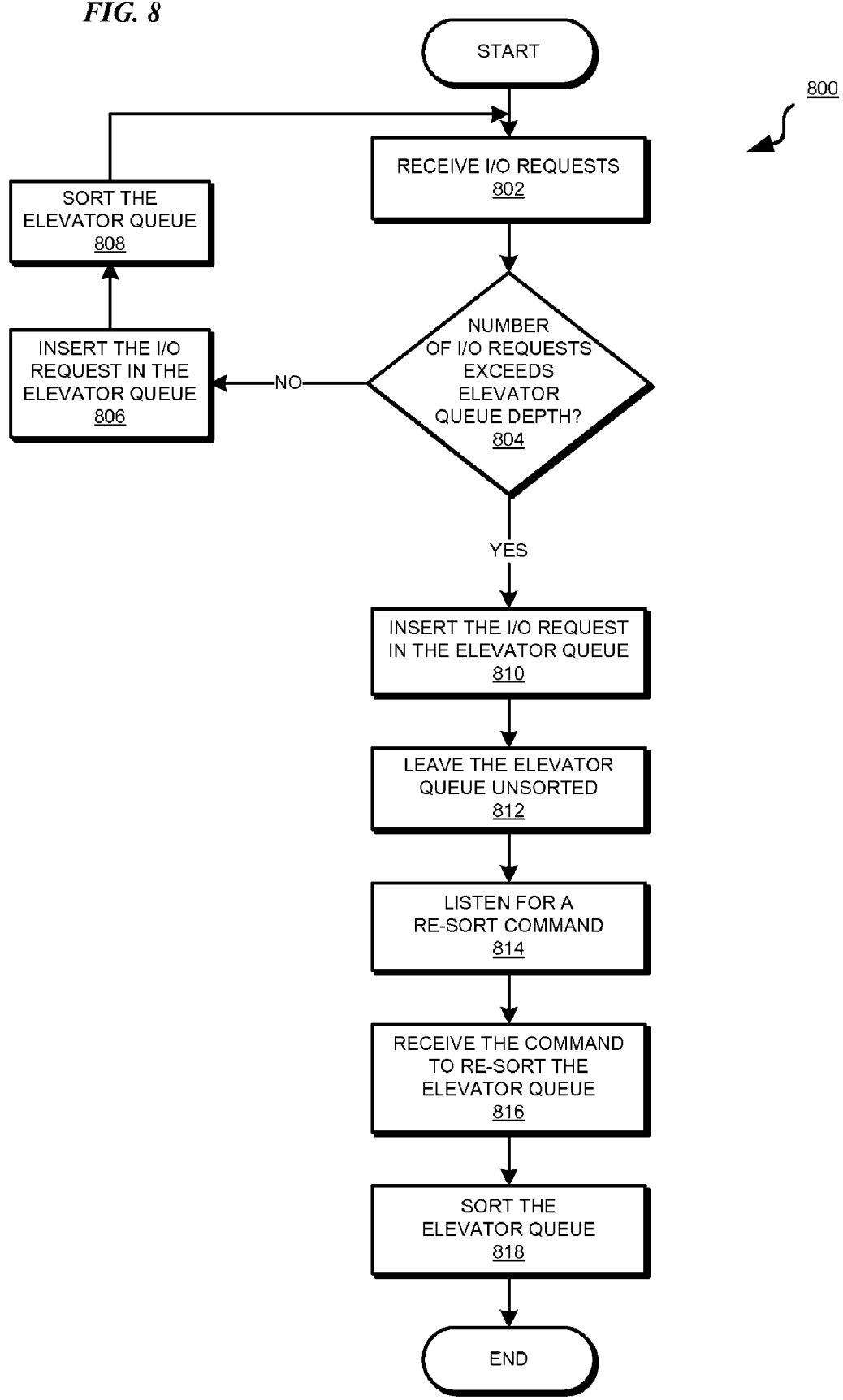
FIG. 8 depicts a flowchart of a process of re-initiating sorting of the elevator queue in accordance with an illustrative embodiment.

With reference to FIG. 8, this figure depicts a flowchart of a process of re-initiating sorting of the elevator queue in accordance with an illustrative embodiment process 800 may be implemented in a component implementing a sorting algorithm in a device driver, such as the component labeled "sorting algorithm 504" in FIG. 5.

Process 800 begins by receiving I/O requests (step 802). Process 800 determines whether the number of I/O requests received in step 802 exceeds the elevator queue depth (step 804). A queue depth is the number of entries a queue can hold.

If process 800 determines that the number of I/O requests does not exceed the elevator queue depth ("No" path of step 804), process 800 inserts the I/O request received in step 802 into the elevator queue (step 806). Process 800 sorts the elevator queue (step 808). Process 800 returns to step 802 to receive more I/O requests.

If process 800 determines that the number of I/O requests exceeds the elevator queue depth ("Yes" path of step 804), process 800 inserts the I/O request in the elevator queue (step 810). The insertion of step 810 may be in the order the I/O requests are received.

Process 800 leaves the elevator queue unsorted (step 812). Process 800 listens for a re-sort command (step 814). Process 800 receives the command to re-sort the elevator queue (step 816). In one embodiment, process 800 may listen for, check, determine, receive, or detect, another indication of re-sorting in step 814, and act accordingly in step 816, within the scope of the illustrative embodiments.

Process 800 sorts the elevator queue (step 818). Process 800 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for an improved data storage device driver. Using the illustrative embodiments, a device driver can re-initiate sorting, coalescing, or sorting and coalescing of the I/O requests stored in the device driver's elevator queue. A device driver implementing the illustrative embodiments need not be re-initialized to reinitiate the sorting and coalescing process.

The illustrative embodiments are described with respect to a device driver only as an example and a device driver based implementation is not limiting on the illustrative embodiments. The illustrative embodiments can be implemented in a software application or firmware in forms other than a device driver within the scope of the illustrative embodiments.

Further, the illustrative embodiments are described with respect to I/O requests targeted to a data storage device only as an example and such requests or target devices are not limiting on the illustrative embodiments. For example, the illustrative embodiments may be practiced with any type of request targeted to any type of device associated with any type of device driver.

Additionally, the illustrative embodiments are described with respect to a re-sort threshold only as an example for the clarity of the description. Using a single re-sort threshold is not limiting on the illustrative embodiments. An implementation may use several threshold values, several tolerance values for threshold values, or a combination thereof in the manner of the illustrative embodiments within the scope of the illustrative embodiments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for managing an elevator queue, the computer implemented method comprising:
    storing a plurality of requests in the elevator queue;
    determining whether the elevator queue is sorted;
    determining, responsive to the elevator queue being unsorted, a number of requests in the elevator queue;
    monitoring the elevator queue, the elevator queue being an unsorted elevator queue;
    detecting reaching a threshold condition in the unsorted elevator queue; initiating sorting the unsorted elevator queue to form a sorted elevator queue; and
    identifying, from the plurality of requests, a set of requests in the sorted elevator queue to coalesce.

2. The computer implemented method of claim 1, wherein the plurality of requests are I/O requests for a data storage device.

3. The computer implemented method of claim 1, wherein the elevator queue is sorted according to an ascending order of data block addresses in the plurality of requests.

4. The computer implemented method of claim 1, wherein the monitoring monitors a remaining number of unsorted requests in the elevator queue as requests are removed from the elevator queue.

5. The computer implemented method of claim 1, wherein the threshold condition is associated with a threshold value, and wherein reaching the threshold condition is reaching the threshold value.

6. The computer implemented method of claim 1, wherein the reaching the threshold value is reaching within a tolerance value from the threshold value.

7. The computer implemented method of claim 1, further comprising:
    detecting reaching a second threshold condition in the elevator queue; and
    initiating coalescing the set of requests in the elevator queue.

8. The computer implemented method of claim 7, wherein the second threshold condition is the same as the threshold condition.

9. A computer usable program product comprising a computer usable medium including computer usable code for managing an elevator queue, the computer usable code comprising:
    computer usable code for storing a plurality of requests in the elevator queue;
    computer usable code for determining whether the elevator queue is sorted;

computer usable code for determining, responsive to the elevator queue being unsorted, a number of requests in the elevator queue;

computer usable code for monitoring the elevator queue, the elevator queue being an unsorted elevator queue;

computer usable code for detecting reaching a threshold condition in the unsorted elevator queue;

computer usable code for initiating sorting the unsorted elevator queue to form a sorted elevator queue; and computer usable code for identifying, from the plurality of requests, a set of requests in the sorted elevator queue to coalesce.

10. The computer usable program product of claim 9, wherein the plurality of requests are I/O requests for a data storage device.

11. The computer usable program product of claim 9, wherein the monitoring monitors a remaining number of unsorted requests in the elevator queue as requests are removed from the elevator queue.

12. The computer usable program product of claim 9, wherein the threshold condition is associated with a threshold value, and wherein reaching the threshold condition is reaching the threshold value.

13. The computer usable program product of claim 9, wherein the reaching the threshold value is reaching within a tolerance value from the threshold value.

14. The computer usable program product of claim 9, further comprising:

computer usable code for detecting reaching a second threshold condition in the elevator queue; and computer usable code for initiating coalescing the set of requests in the elevator queue.

15. A data processing system for managing an elevator queue, the data processing system comprising:

a storage device including a storage medium, wherein the storage device stores computer usable program code; and a processor, wherein the processor executes the computer usable program code, and wherein the computer usable program code comprises:

computer usable code for storing a plurality of requests in the elevator queue;

computer usable code for determining whether the elevator queue is sorted;

computer usable code for determining, responsive to the elevator queue being unsorted, a number of requests in the elevator queue;

computer usable code for monitoring the elevator queue, the elevator queue being an unsorted elevator queue;

computer usable code for detecting reaching a threshold condition in the unsorted elevator queue;

computer usable code for initiating sorting the unsorted elevator queue to form a sorted elevator queue; and computer usable code for identifying, from the plurality of requests, a set of requests in the sorted elevator queue to coalesce.

16. The data processing system of claim 15, wherein the plurality of requests are I/O requests for a data storage device.

17. The data processing system of claim 15, wherein the monitoring monitors a remaining number of unsorted requests in the elevator queue as requests are removed from the elevator queue.

18. The data processing system of claim 15, wherein the threshold condition is associated with a threshold value, and wherein reaching the threshold condition is reaching the threshold value.

19. The data processing system of claim 15, wherein the reaching the threshold value is reaching within a tolerance value from the threshold value.

20. The data processing system of claim 15, further comprising:

computer usable code for detecting reaching a second threshold condition in the elevator queue; and computer usable code for initiating coalescing the set of requests in the elevator queue.

* * * * *